United States Patent
Chen et al.

(10) Patent No.: US 11,219,106 B2
(45) Date of Patent: Jan. 4, 2022

(54) DUMMY LOAD CIRCUIT AND ELECTRICAL LOAD FOR SINGLE LIVE WIRE SWITCH

(71) Applicant: Consumer Lighting (U.S.), LLC, Norwalk, CT (US)

(72) Inventors: Weihu Chen, Shanghai (CN); Dong Xing, Shanghai (CN); Aijun Wang, Shanghai (CN); Zhiyong Wang, Shanghai (CN); JinPeng Hu, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 61 days.

(21) Appl. No.: 16/798,282

(22) Filed: Feb. 21, 2020

(65) Prior Publication Data

US 2021/0037626 A1 Feb. 4, 2021

(30) Foreign Application Priority Data

Jul. 31, 2019 (CN) .......................... 201910706898.7

(51) Int. Cl.
*H05B 45/3575* (2020.01)
*H05B 45/3725* (2020.01)
*H05B 45/10* (2020.01)

(52) U.S. Cl.
CPC ......... *H05B 45/3575* (2020.01); *H05B 45/10* (2020.01); *H05B 45/3725* (2020.01)

(58) Field of Classification Search
None
See application file for complete search history.

(56) References Cited

U.S. PATENT DOCUMENTS

| | | | | |
|---|---|---|---|---|
| 3,180,974 A * | 4/1965 | Darling | ............... | H01F 27/2823 219/497 |
| 4,158,792 A * | 6/1979 | Kuroi | ..................... | H05B 41/28 315/86 |
| 5,751,818 A * | 5/1998 | Gertz | ....................... | H04R 3/00 381/123 |
| 6,459,554 B1 * | 10/2002 | Meiners | ................. | H01H 47/32 327/306 |
| 9,154,311 B2 * | 10/2015 | Heidler | ................... | H04L 12/10 |
| 10,716,179 B1 * | 7/2020 | Wang | ..................... | H05B 45/37 |
| 10,904,972 B2 * | 1/2021 | Chen | ................. | H05B 45/3725 |
| 10,917,949 B2 * | 2/2021 | Krick | ................... | B60Q 1/2696 |
| 10,959,307 B2 * | 3/2021 | Benning | .............. | H05B 45/315 |
| 2013/0187481 A1 * | 7/2013 | Heidler | ................... | H04L 12/10 307/116 |
| 2020/0146123 A1 * | 5/2020 | Chen | ..................... | H05B 45/357 |
| 2020/0178372 A1 * | 6/2020 | Benning | ............... | H05B 45/10 |
| 2021/0037626 A1 * | 2/2021 | Chen | ................. | H05B 45/3575 |
| 2021/0084738 A1 * | 3/2021 | Hall | ...................... | H05B 47/19 |

* cited by examiner

*Primary Examiner* — Amy Cohen Johnson
*Assistant Examiner* — Srinivas Sathiraju
(74) *Attorney, Agent, or Firm* — Wood IP LLC

(57) ABSTRACT

The present invention relates to a dummy load circuit for a single live wire switch. This includes: a switch circuit—at least a first resistor and a switch are connected in the switch circuit, wherein the first resistor is connected to the switch, such that the first resistor is connected to the dummy load circuit through the switch; and a switch control circuit—the switch control circuit at least includes a switch control device, wherein the switch control device is connected to the switch to facilitate power-on/off control. The invention also relates to an electrical load with a dummy load circuit.

8 Claims, 5 Drawing Sheets

ND ELECTRICAL
DUMMY LOAD CIRCUIT AND ELECTRICAL LOAD FOR SINGLE LIVE WIRE SWITCH

I. TECHNICAL FIELD

The present invention relates to a dummy load circuit and an electrical load for a single live wire switch.

II. BACKGROUND

At present, the two-wire smart switch (dimmer) of a single wireless model (Zigbee, BT, etc.) is generally seen in the market. This two-wire smart switch is called a single live wire smart switch. They are compatible with a wide range of electrical load types, such as LED lights, fans, conventional tungsten lamps, and so on.

The design of a two-wire smart switch with dual wireless mode (e.g., BLE+WiFi) is also much desired right now. However, this poses a huge challenge in terms of load power supply, because in dual wireless mode (e.g., BLE+WiFi), the power consumption of the smart switch is about 4-5 times that of the single wireless model.

In the single wireless mode, there are already ghosting and flickering problems in the single live wire smart switch. This is because the single live wire smart switch has no neutral wire, and is only connected on the live wire. Therefore, the switch draws power from the load current. That is to say, even if the load is turned off as per normal, there is still current flowing through the load to maintain the operation of the switch.

In the dual wireless mode where power consumption of the single live wire smart switch is more significant, such ghosting and flickering problems are even more difficult to overcome; moreover, it is difficult to ensure the normal power consumption of the single live wire smart switch when certain electrical load is turned on as per normal. On the one hand, in this application scenario, compatibility with different load types becomes a more complex issue, which also results in poorer compatibility. For example, it is difficult to achieve compatibility with smart LEDs and non-dimming LEDs, therefore flickering in the power-on state and ghosting in the power-off state will occur. In addition, in the dual wireless mode, the zero-crossing detection of the single live wire smart switch is also a big problem.

In order to solve the flickering and glimmering problems, in the single wireless mode, the X2 capacitor has been used as a dummy load to solve the issue of compatibility. The dummy load is connected in parallel with the electrical load. However, the X2 capacitor is not suitable for dual wireless mode. This is because, due to capacitance limit, the X2 capacitor cannot provide sufficient current for power by the single live wire smart switch in the dual-wire mode. If the X2 capacitor is used as a dummy load, a very obvious ghosting phenomenon would be observed. In addition, the X2 capacitor is unable to provide very accurate zero-crossing detection for all electrical loads.

If a pure resistor is used as the load, even though most of the above requirements can be met, this will also result in power consumption exceeding 8 W in the power-on state, which is basically unacceptable in the application.

III. SUMMARY

In order to overcome the above problems, the present invention provides a dummy load circuit and an electrical load with the dummy load circuit for a single live wire switch, which reduces power consumption of the power take-off in the power-on state and ensures no ghosting in the power-off state; while also providing accurate zero-crossing detection.

In the present application, the term "single live wire switch" has the same meaning as the term "single live wire smart switch."

According to the present invention, the dummy load circuit for the single live wire switch includes:

a switch circuit—at least a first resistor and a switch are connected in the switch circuit, wherein the first resistor is connected to the switch, so that the first resistor is connected to the dummy load circuit through the switch; and a switch control circuit—the switch control circuit at least includes a switch control device, wherein the switch control device is connected to the switch to facilitate switch control.

In the dummy load circuit according to the present invention, the switch is controlled by the switch control device, and the first resistor in the dummy load circuit is connected to the circuit of the system in a lower voltage range of each cycle of the mains electricity, and the first resistor in the dummy load circuit is disconnected in a higher voltage range of each cycle of the mains electricity. When the system is turned off, the first resistor of the dummy load circuit provides most of the power to the system, thereby avoiding the ghosting of the lamp load. In the case of using the dummy load circuit in accordance with the present invention, by accessing the first resistor as needed, the power consumption of the power take-off by the single live wire switch is significantly reduced and the switch also shows excellent thermal performance.

In an embodiment in accordance with the present invention, the switch is connected when the voltage of the dummy load circuit rises from zero to a first threshold, and the switch control device causes the switch to disconnect when the voltage continues to rise to a second threshold. The switch control device causes the switch to be connected when the voltage of the dummy load circuit drops from a high voltage to a third threshold, and the switch autonomously disconnects when the voltage continues to drop to a fourth threshold. This constitutes threshold intervals for the switch. The upper limit value of the threshold interval is, for instance, a voltage value at which the lamp load does not operate. Therefore, the upper limit value of the threshold interval can be set in advance in accordance with the electrical parameters of the electrical load. According to the upper limit of the threshold interval set in advance, it is possible, for instance, to ensure stable power take-off by the electrical load in the power-on state or that no ghosting occurs in the power-off state due to insufficient electric current for power take-off by the single live wire switch. Thus, the compatibility of the single live wire switch with different types of electrical load is improved by means of the dummy load circuit.

In an embodiment in accordance with the present invention, the switch control circuit further comprises a purely resistive circuit for providing a purely resistive path for the single live wire switch to assist in accurate zero-crossing detection; the purely resistive circuit includes at least one other resistor with a voltage proportional to the threshold of the switch; and the purely resistive circuit is connected to the switch control device such that the switch control device operates in accordance with the voltage of the other resistor. A purely resistive circuit may be composed of a plurality of other resistors, or it may only have one other resistor.

On the one hand, by adjusting the resistance of the purely resistive circuit, the upper limit of the threshold interval matching different types of electrical load can be achieved. On the other hand, the purely resistive circuit is connected between the input terminal and the output terminal of the dummy load circuit, so that the purely resistive circuit is connected in parallel with the electrical load. As a result, during zero-crossing detection, the resistance of the purely resistive circuit can help the single live wire switch accurately detect the zero-crossing point of the mains voltage.

In the case of conventional electrical loads, such as lamp loads, although zero-crossing detection is also performed, it is generally performed on mains electricity. The inventors have noted that this conventional zero-crossing detection is not suitable for the case where electrical loads are connected in series. In a series circuit of electrical loads, what the single live wire switch detects is not the conventional mains voltage, but the voltage between the load and the grid's live wire. If the electrical loads in series do not provide a purely resistive path to the mains electricity, it will cause inaccuracy in the zero-crossing detection. In the present invention, deviation in the zero-crossing detection caused by some electrical loads can be compensated by the purely resistive circuit. Therefore, with the purely resistive circuit in place, the single live wire switch can achieve more accurate zero-crossing detection.

In an embodiment of the present invention, a rectifier circuit is further connected between the input terminal of the dummy load circuit and the switch circuit and switch control circuit. The rectifier circuit rectifies the alternating current into direct current. Furthermore, depending on the type of electrical load used, different rectifier circuits can be designed. For example, the rectifier circuit can be implemented in the form of a bridge rectifier. When the switch is a MOS tube, the bidirectional conduction of the switch can be realized by the bridge rectifier, so that the first resistor of the dummy load circuit can be connected in two half-wave periods of the sinusoidal voltage signal of the alternating current. The rectifier circuit can also be implemented in the form of a diode. In the case of a diode, the first resistor of the dummy load circuit is only accessed during one half-wave period of the sinusoidal voltage signal. In the present invention, the design of the rectifier circuit matches the type of electrical load used. Those skilled in the art can design various rectifier circuits, such as full-bridge, half-bridge, and straight-pull circuits, as needed.

In another embodiment of the present invention, a clamping circuit is further connected between the input terminal of the dummy load circuit and the switch circuit and switch control circuit. The clamping circuit can be formed in a conventional manner by a voltage clamping device such as a diode clamp, a thermistor, or a varistor.

Moreover, the present invention also relates to an electrical load with a dummy load circuit in accordance with the invention, in particular an LED lamp, a fan, etc.

IV. BRIEF DESCRIPTION OF THE DRAWINGS

The drawings form a part of this specification to assist in a further understanding of the present invention. The drawings illustrate the embodiments of the present invention and serve to explain the principles of the present invention, along with the specification. The same components are denoted by the same reference number in the drawings. The drawings illustrate as follows.

REFERENCE MARKS

V(mains): Input grid voltage;
V(l_Load): Voltage of the electrical load and the dummy load circuit;
V(mains, L_load): Voltage of the single live wire switch;
I(Fuse): Input current of the dummy load circuit
I(R1): Current on the first resistor
V(l_Load)*I(Fuse): Power consumption of the dummy load circuit.

V. DETAILED DESCRIPTION

To enable better understanding of the solution of the present invention, the technical solutions in the embodiments of the present invention are clearly and completely described in conjunction with the drawings in the embodiments of the present invention. It is apparent that the described embodiments are merely a part rather than all of the embodiments of the present application. All other solutions obtained by a person of ordinary skill in the art based on the embodiments of the present invention without creative efforts shall fall within the protection scope of the present invention.

Figure 1:
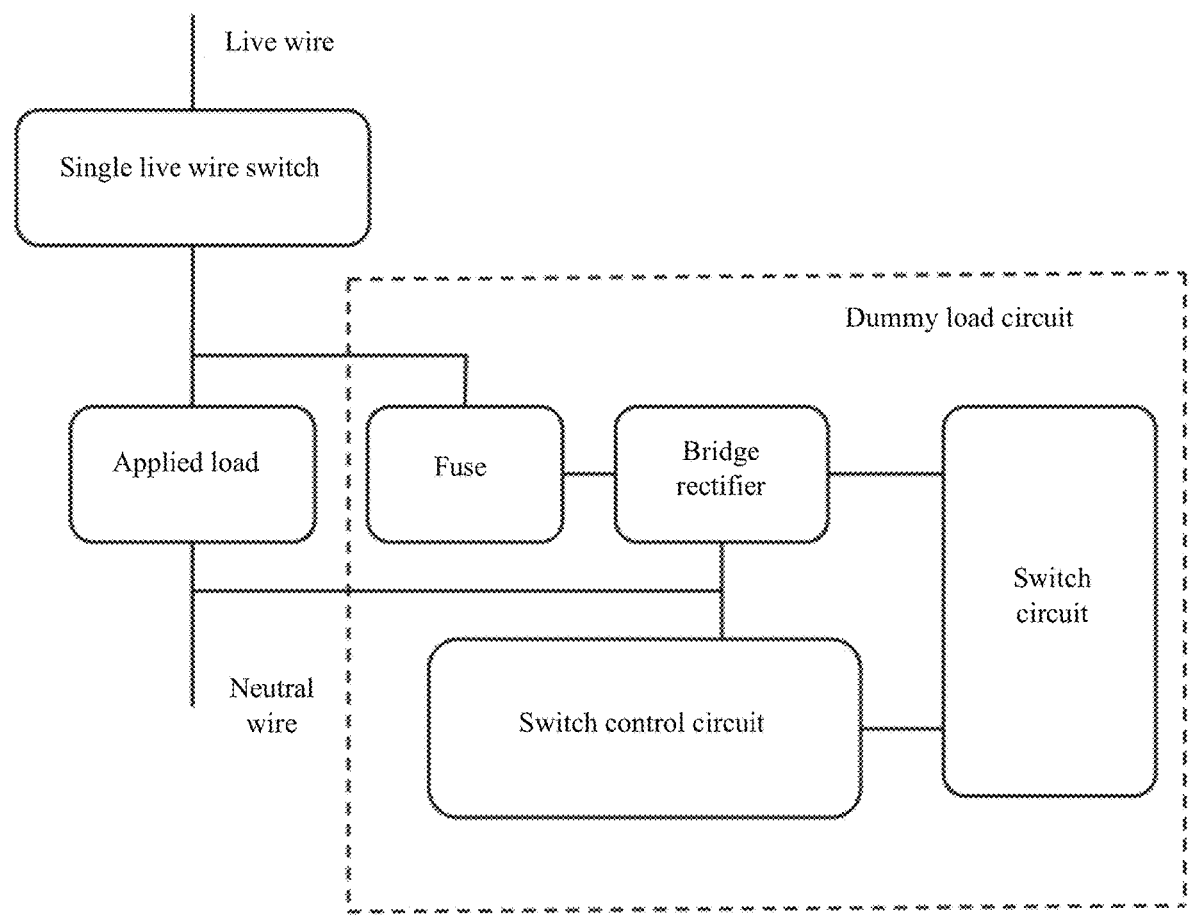
FIG. 1 shows a schematic diagram of the present invention.

FIG. 1 shows a schematic diagram of the present invention. According to FIG. 1, the single live wire switch is connected to the electrical load on the live wire, and the electrical load is connected in parallel with the dummy load circuit in accordance with the present invention, between the live wire and neutral wire. In FIG. 1, the dummy load circuit according to the present invention includes: fuse; rectifier circuit; switch control circuit; switch circuit. The switch control circuit herein includes a purely resistive circuit and a switch control device. The switch circuit includes a first resistor and a switch.

Figure 2:
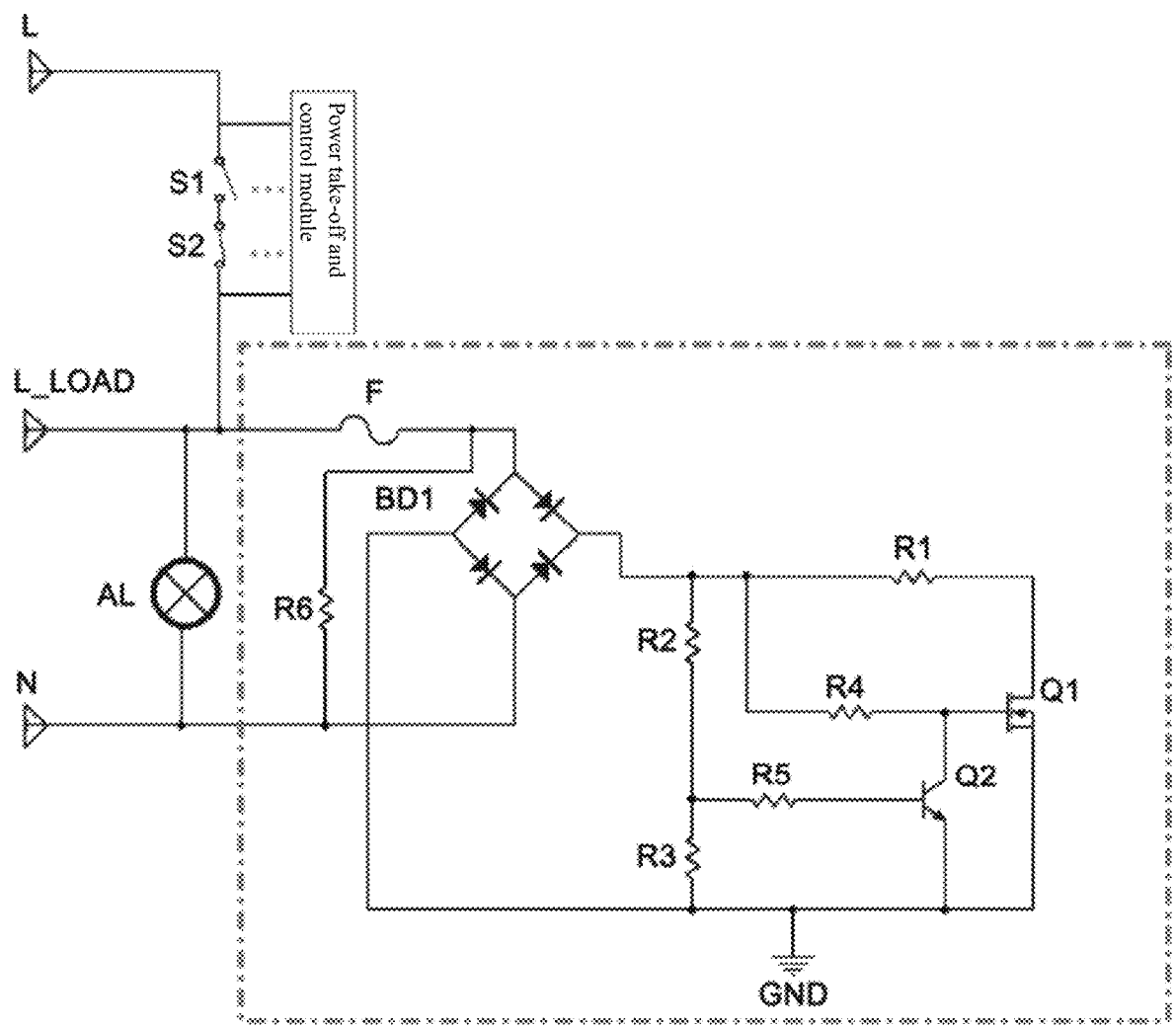
FIG. 2 shows a schematic circuit diagram of one embodiment of the dummy load circuit in accordance with the present invention.

FIG. 2 shows a schematic circuit diagram of one embodiment of the dummy load circuit according to the present invention. In a system circuit consisting of a single live wire switch and an electrical load AL, the dummy load circuit according to the present invention is shown in dashed lines. This includes: fuse F; bridge rectifier BD1; switch circuit composed of first resistor R1 and first switch Q1; switch control circuit composed of second resistor R2, third resistor R3, fourth resistor R4, fifth resistor R5 and switch control device Q2; and sixth resistor R6 between the fuse F and the bridge rectifier and connected in parallel with the electrical load.

The first switch Q1 herein is a MOS transistor, and the switch control device Q2 is a bipolar junction transistor (BJT). The drain of the MOS transistor Q1 is connected to one terminal of the first resistor R1, and its source is grounded. Furthermore, the gate of the MOS transistor Q1 is connected to the collector of the transistor Q2, and a fourth resistor R4 is further connected upstream of the gate and the collector.

The emitter of transistor Q2 is grounded and the base is connected to one terminal of the fifth resistor. The fifth resistor is connected to the purely resistive circuit composed of the second resistor R2 and the third resistor R3; specifically, it is connected between the second resistor R2 and the third resistor R3.

As shown in FIG. 2, the dummy load circuit is connected in parallel with the electrical load AL. The electrical load AL herein is, for instance, an LED light. The single live wire switch, that is, the power take-off and control module is connected in series on the live wire upstream of the electrical load, and the power-on/off and power take-off function of the single live wire switch is realized by the switches S1 and S2, that is, the function of turning on and off the electrical load.

In the embodiment shown in FIG. 2, the respective threshold values for the switches are set by adjusting the values of the second, third, and fifth resistors.

As the voltage Vd on the dummy load circuit rises from zero to the first threshold, the MOS transistor is turned on at this time and the first resistor R1 is thereby connected. As a result, a current flows through the bridge rectifier BD1, the first resistor R1, and the MOS transistor Q1 to form a loop.

When the voltage Vd rises from zero to the second threshold Vdt, the transistor Q2 is in a saturated state and it is turned on, so that current flows from the collector of the transistor Q2 to the emitter. As the collector of the transistor Q2 is connected to the gate of the MOS transistor, the MOS transistor is turned off at this time, and the first resistor R1 is thereby disconnected. Therefore, a current flows through the bridge rectifier BD1, the fourth resistor, and the transistor Q2 to form a loop.

In the case where the voltage Vd on the dummy load circuit drops from the high voltage level, when the voltage Vd falls to the third threshold, the transistor Q2 is in a disconnected state, so that no current flows between the collector and the emitter of the transistor Q2. The third threshold herein may be equal to the second threshold Vdt, but obviously, the two may also be unequal according to requirements. Therefore, the MOS transistor is turned on again, and the first resistor R1 is thereby connected. When the voltage Vd falls to the fourth threshold (zero value), the MOS transistor is turned off and the first resistor R1 is also disconnected from the dummy load circuit. The fourth threshold herein may be equal to the first threshold, but obviously, the two may also be unequal according to requirements.

Figure 3:
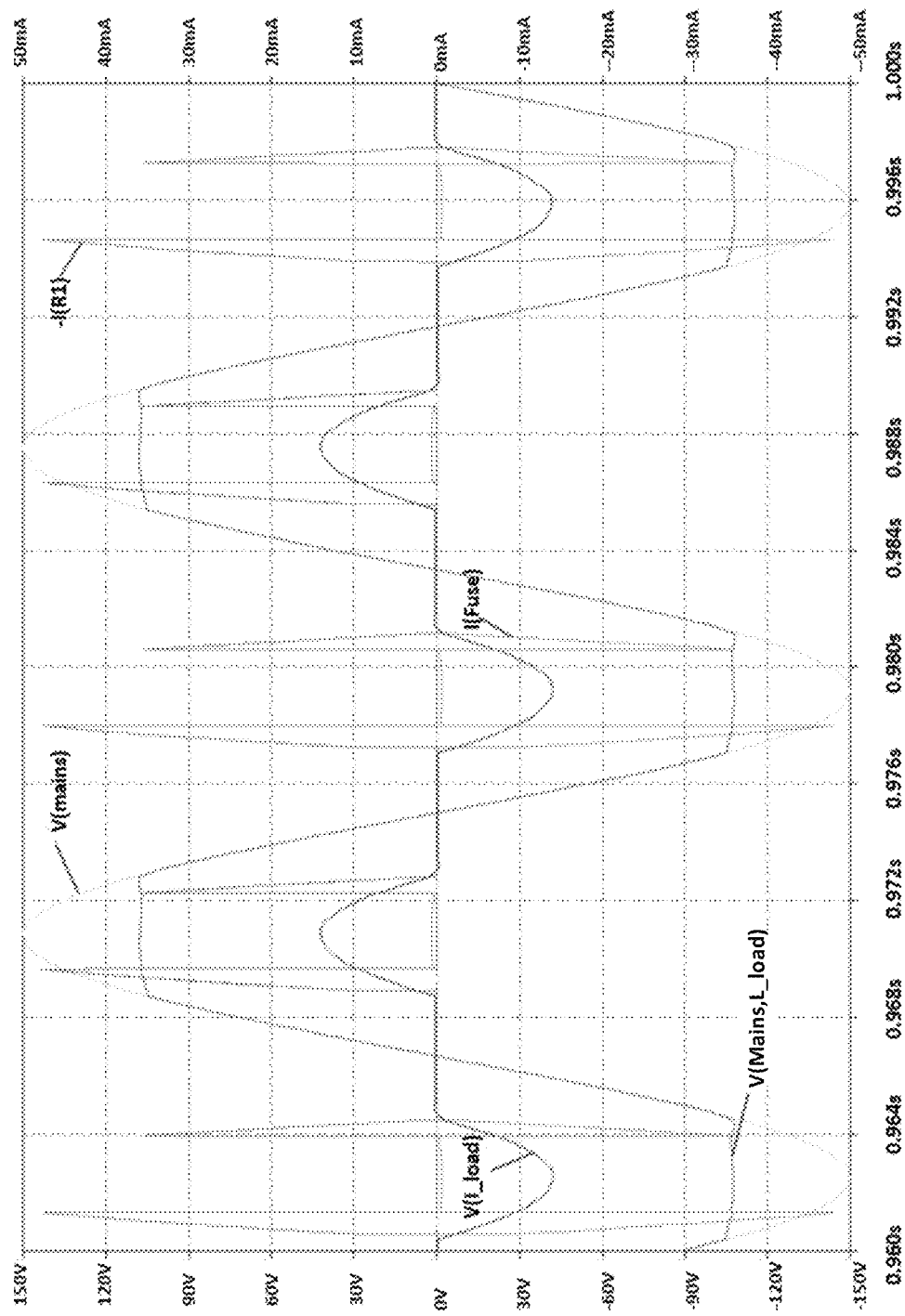
FIG. 3 shows a voltage-current waveform diagram of a single live wire switch in accordance with one embodiment of the present invention.
Figure 4:
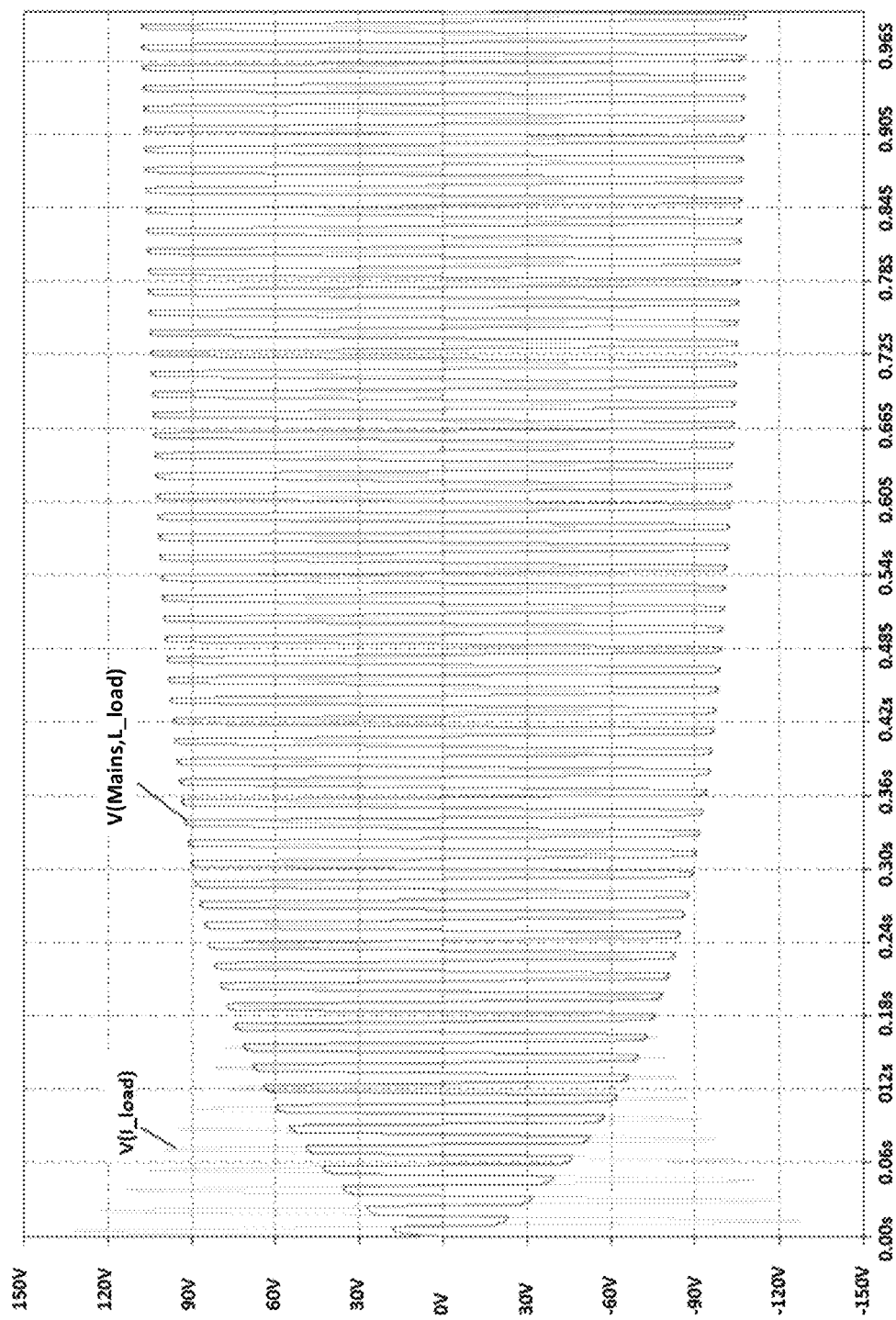
FIG. 4 shows a voltage waveform diagram of a single live wire switch in a power-off state in accordance with one embodiment of the present invention.
Figure 5:
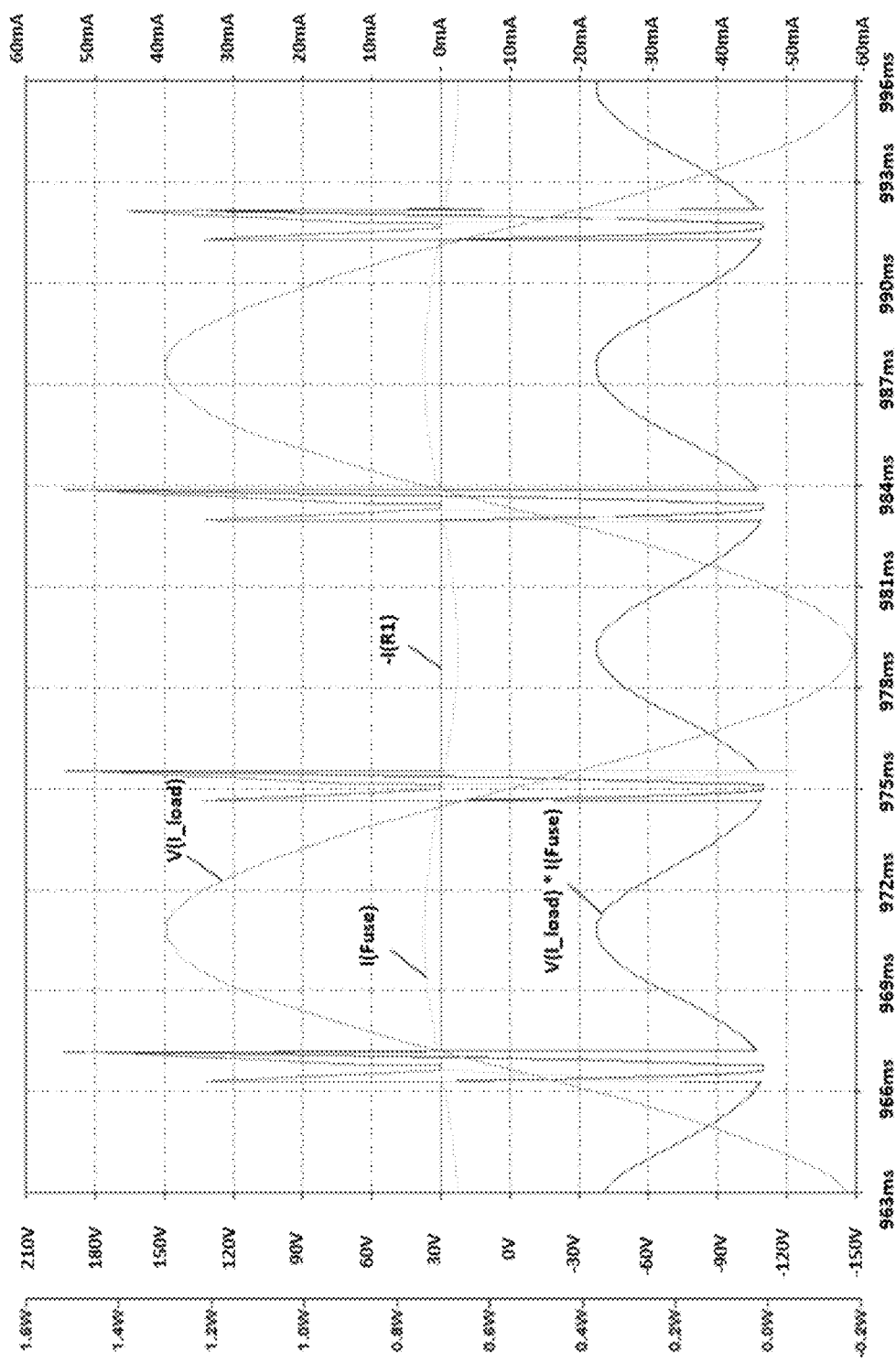
FIG. 5 shows a voltage-current waveform diagram of a single live wire switch in a power-on state in accordance with one embodiment of the present invention.

FIGS. 3 to 5 show voltage-current waveforms for a single live wire switch with the system in the power-on and power-off state.

FIG. 3 shows the input grid voltage V(mains), the electrical load and the voltage of the dummy load circuit V(l_Load), the voltage of the single live wire switch V(mains, L_load), the input current of the dummy load circuit I(Fuse), and the current on the first resistor I(R1). Among them, the input grid voltage V(mains) is in the form of a symmetrical sine wave. The voltage of the electrical load and dummy load circuit V(l_Load) in a semi-elliptical shape is also shown. At both terminals of the voltage V(l_Load), sharply-protruding currents on the first resistor I(R1) can be clearly seen. This indicates that the first resistor is now connected. After the first resistor is connected, the current flows through the power input capacitor of the single live wire switch and charges it.

FIG. 4 shows the voltage of the electrical load and dummy load circuit V(l_Load) and the voltage of the single live wire switch V(mains, L_load) in the power-off state. Decreasing from left to right is the voltage of the electrical load and the dummy load circuit V(l_Load). Increasing gradually from left to right is the voltage of the single live wire switch V(mains, L_load). It can be seen that when the electrical load is turned off, the single live wire switch can also draw power stably and the voltage is in a form of regular fluctuations.

FIG. 5 shows the power consumption of the dummy load circuit V(l_Load)*I(Fuse), the voltage of the electrical load and the dummy load circuit V(l_Load), the input current of the dummy load circuit I(Fuse), and the current on the first resistor I(R1) in the power-on state. It can be seen that the maximum power consumption does not exceed 1.6 W when the single live wire switch is fully turned on. On average, its power consumption is less than 0.3 W. After testing, the average power consumption is 215.73 mW and the total energy consumption is 8.6294 mJ in the 40 ms interval. Conversely, conventional dummy loads with the same performance (such as pure resistors) consume about 8 W, and face extremely severe thermal overload and power loss problems.

Hence, the dummy load circuit of the present invention greatly reduces the power consumption of the power take-off by the single live wire switch as compared to the pure resistor conventionally used in the prior art. Therefore, even in the high-power dual wireless mode, the single live wire switch can be compatible with different types of electrical load without causing problems such as flickering, ghosting or even short circuit.

Furthermore, in the present invention, by using the purely resistive circuit composed of the second resistor R2 and the third resistor R3, compensation for the electrical load AL is also realized in the zero-crossing detection. In the zero-crossing detection, as the single live wire switch is only connected on the live wire, and it may be in a series circuit composed of multiple electrical loads, the voltage zero-crossing detected by the single live wire switch will be affected by some electrical loads without a purely resistive path, thereby resulting in distortion. The distortion of this voltage zero-crossing detection can be compensated by a purely resistive circuit. Thus, the dummy load circuit in accordance with the present invention also provides the possibility of performing precise zero-crossing detection in a single live wire switch.

Although the purely resistive circuit and the sixth resistor are simultaneously present in the circuit shown in FIG. 2, in one embodiment of the present invention, only the sixth resistor connected to the rear of the fuse F may be used. This also enables compensation for the resistance of the electrical load. Of course, the number of resistors included in the purely resistive circuit may also be set according to actual needs, as long as the resistor's function of compensating for the resistance of the electrical load is maintained.

In an alternative embodiment of the present invention, a diode is used in place of the bridge rectifier for rectification. In the case of a diode, the first resistor R1 of the dummy load circuit can only be connected to the diode in a half-wave circuit. This can be realized depending on the type of electrical load used.

Although the single live wire switch and the dummy load circuit are shown separately as two parts in FIGS. 1 and 2, it is also conceivable to integrate the single live wire switch with the electrical load. This also achieves greater user-friendliness.

The above are only the preferred embodiments of the present invention, and are not intended to limit the present invention. It will be apparent to those skilled in the art that various modifications and changes may be made to the present invention. Any modifications, equivalent alternatives and improvements made without departing from the spirit and principle of the present invention shall fall within the protection scope of the invention.

What is claimed is:

1. A dummy load circuit for a single live wire switch, the dummy load circuit comprising:
    a switch circuit—at least a first resistor and a switch are connected in the switch circuit, such that the first resistor is connected to the dummy load circuit through the switch;
    a switch control circuit—the switch control circuit at least includes a switch control device that is connected to the switch to facilitate power-on/off control; and
    a purely resistive circuit for providing a purely resistive path for the single live wire switch to assist in zero-crossing detection; said purely resistive circuit includes at least one other resistor with a voltage proportional to a threshold of the switch; and the purely resistive circuit is connected to the switch control device such that the switch control device operates in accordance with the voltage of the other resistor,
    wherein said switch is connected when the voltage of the dummy load circuit rises from zero to a first threshold, and the switch control device causes the switch to disconnect when the voltage continues to rise to a second threshold; the said switch control device causes the switch to be connected when the voltage of the dummy load circuit drops from a high voltage to a third threshold, and the switch autonomously disconnects when the voltage continues to drop to a fourth threshold.

2. The dummy load circuit of claim 1, wherein a rectifier circuit is further connected between an input terminal of the dummy load circuit and the switch circuit and switch control circuit.

3. The dummy load circuit of claim 2, wherein said rectifier circuit comprises a bridge rectifier.

4. The dummy load circuit of claim 2, wherein said rectifier circuit comprises a diode.

5. The dummy load circuit of claim 1, wherein a clamping circuit is further connected between an input terminal of the dummy load circuit and the switch circuit and switch control circuit.

6. The dummy load circuit of claim 1, wherein the dummy load circuit is connected in parallel with the electrical load of the single live wire switch.

7. An electrical load having a dummy load circuit of claim 1.

8. The electrical load of claim 7, wherein said electrical load is an LED light.

* * * * *